J. S. RYDELL.
SURGICAL INSTRUMENT.
APPLICATION FILED OCT. 5, 1908.
958,179.
Patented May 17, 1910.
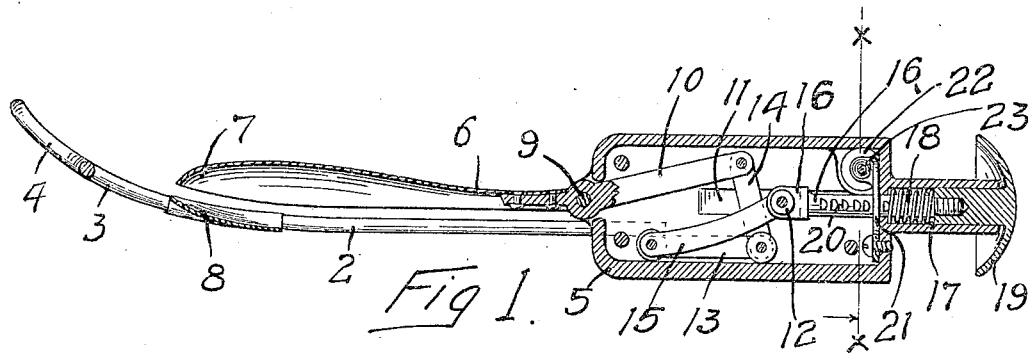
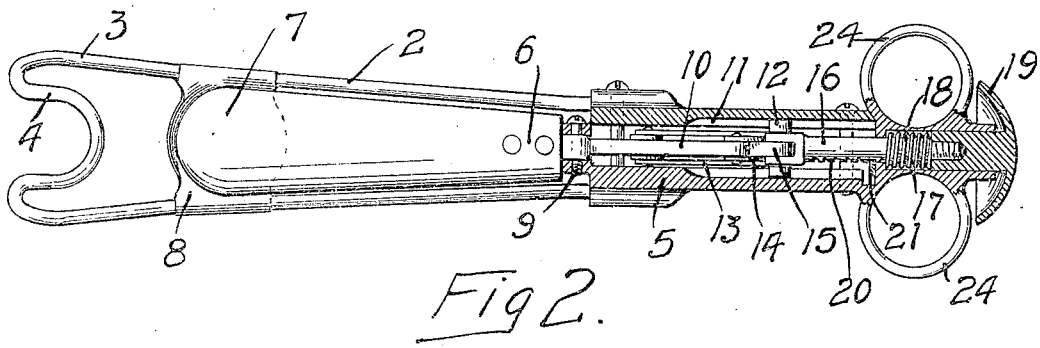
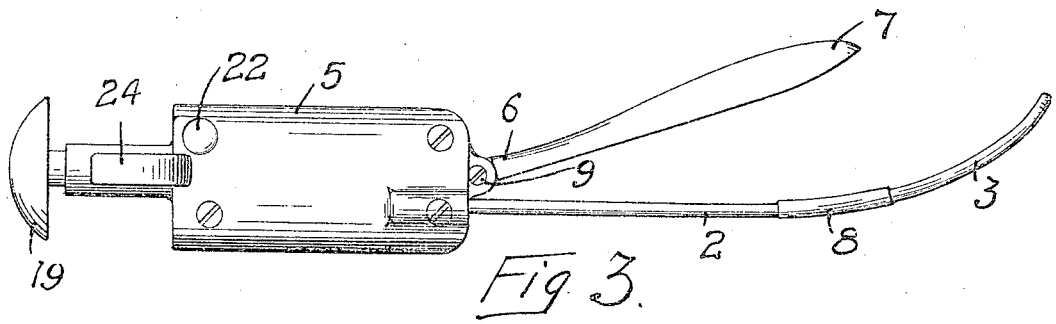
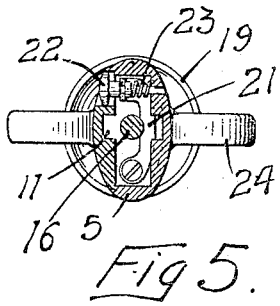
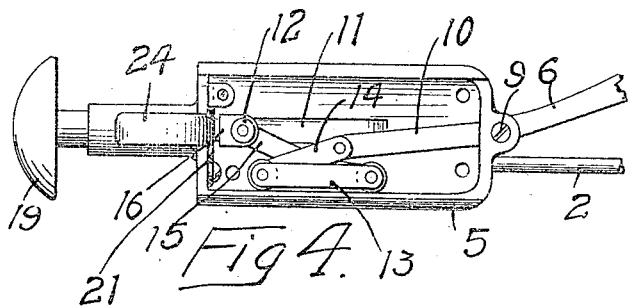
WITNESSES
INVENTOR
JOHN S. RYDELL
BY Paul & Paul
HIS ATTORNEYS

UNITED STATES PATENT OFFICE.

JOHN S. RYDELL, OF MINNEAPOLIS, MINNESOTA.

SURGICAL INSTRUMENT.

958,179. Specification of Letters Patent. Patented May 17, 1910.

Application filed October 5, 1908. Serial No. 456,119.

*To all whom it may concern:*

Be it known that I, JOHN S. RYDELL, of Minneapolis, Hennepin county, Minnesota, have invented certain new and useful Improvements in Surgical Instruments, of which the following is a specification.

The object of my invention, is to provide an instrument for correcting abnormal positions or displacements of the uterus such as retro-verted, retro-flexed, ante-verted, ante-flexed, dextro-verted and sinistro-verted.

A further object, is to provide an instrument by means of which adhesions formed between the uterus and surrounding tissues may be broken.

The invention consists generally in an instrument having a part to force the peritoneum in front of it and a speculum shaped part to grasp and hold the cervix to permit the uterus to be pulled forward, allowing space for it to pass the curve in the sacrum.

In the accompanying drawing forming part of this specification, Figure 1, is a sectional view of an instrument embodying my invention, Fig. 2, is a top view partially in section on a section line substantially at right angles to the section line of Fig. 1, Fig. 3, is an outside view showing the speculum shaped cervix grasping lever in its raised position, Fig. 4, is a detail view illustrating the position of the mechanism when the speculum shaped lever is raised, Fig. 5, is a sectional view on the line $x$—$x$ of Fig. 1.

In the drawing, 2 represents a lever having a curved forward portion 3, terminating in a recessed end 4. This lever engages the mucous membrane of the posterior wall of the vagina and forces the peritoneum in front of the instrument. The lever is mounted on a casing.

6 is a curved lever with a speculum shaped part 7 to grasp and hold cervix so that the uterus may be pulled forward, space being provided for it to pass the curve in the sacrum and to adjust it (uterus) in any desired position.

The lever 2 is provided with a depressed plate 8 which coöperates with the lever 6. The lever 6 is pivoted at 9 on the casing 5 and is provided with an arm 10 which projects within the casing. Any suitable mechanism may be employed for operating the lever 6, but I have shown a simple form which I may prefer to use.

The casing 5 has slots 11 therein which are adapted to receive rollers 12 on a plunger 16. A carriage 13 slides back and forth within the casing and is connected with the arm 10 by a link 14. The forward end of the carriage is connected by a link 15 with the plunger 16 and said plunger is adapted to slide in a socket 17 provided in the end of the casing. A spring 18 is mounted on the plunger 16 and a hand grip 19 is carried by said plunger and adapted to be forced inwardly to operate the carriage. The plunger is provided with a series of teeth 20 and a dog 21 is provided to engage said teeth. A push button 22 is mounted in the casing and has a spring 23 which normally holds it in a projected position. When the button is pushed in, the dog will be disengaged from the teeth of the plunger and the carriage drawn back to raise the lever 6, or set the instrument in an open position. Loops 24 are provided on one end of the casing into which the fingers are inserted.

With this instrument abnormal positions of the uterus may be corrected and adhesions easily and quickly broken.

I do not wish to be confined to the mechanism shown for operating the cervix grasping lever as it may be modified in various ways without departing from the spirit of my invention.

I claim as my invention:

1. An instrument of the class described, having a part adapted to force the peritoneum in front of it, and a speculum shaped lever in the rear of said part and between which lever and said part the cervix uteri is grasped and held the forward portion of peritoneum forcing part being bent transversely toward the plane of said lever.

2. An instrument of the class described, comprising a fixed part having a forward portion provided with a recessed end and bent out of the plane of its rear portion, and a speculum shaped lever arranged to oscillate toward and from said part.

3. An instrument of the class described, comprising a lever having a curved forward portion and a depressed plate in the rear of said curved portion, a second lever having a speculum shaped part between which and said plate the cervix uteri is grasped and held in the rear of said curved portion and means for operating said second lever.

4. An instrument of the class described, comprising a lever having a curved forward portion and a second lever having a gripping surface in the rear of said curved portion and between which levers, the cervix uteri is grasped and held.

5. An instrument of the class described comprising a lever having a forward end adapted to force the peritoneum inward, a plate on said lever in the rear of said forward end, and a second lever having a speculum shaped part, between which and said plate the cervix uteri is grasped and held.

In witness whereof, I have hereunto set my hand this 29th day of Sept. 1908.

JOHN S. RYDELL.

Witnesses:
  RICHARD PAUL,
  J. A. BYINGTON.